United States Patent
Larsen, III et al.

(10) Patent No.: US 11,289,231 B2
(45) Date of Patent: Mar. 29, 2022

(54) RADIATION DETECTORS EMPLOYING CONTEMPORANEOUS DETECTION AND DECONTAMINATION

(71) Applicant: SAVANNAH RIVER NUCLEAR SOLUTIONS, LLC, Aiken, SC (US)

(72) Inventors: George K. Larsen, III, Aiken, SC (US); Simona E. Hunyadi Murph, North Augusta, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 29 days.

(21) Appl. No.: 17/004,646

(22) Filed: Aug. 27, 2020

(65) Prior Publication Data

US 2020/0395140 A1 Dec. 17, 2020

Related U.S. Application Data

(62) Division of application No. 16/125,954, filed on Sep. 10, 2018, now Pat. No. 10,790,070.

(51) Int. Cl.
| | |
|---|---|
| *G21F 9/00* | (2006.01) |
| *B08B 7/00* | (2006.01) |
| *G01T 7/00* | (2006.01) |
| *G01T 1/185* | (2006.01) |

(52) U.S. Cl.
CPC ............ *G21F 9/002* (2013.01); *B08B 7/0057* (2013.01); *G01T 1/185* (2013.01); *G01T 7/00* (2013.01)

(58) Field of Classification Search
CPC combination set(s) only.
See application file for complete search history.

(56) References Cited

U.S. PATENT DOCUMENTS

| | | | |
|---|---|---|---|
| 3,005,100 A | 10/1961 | Thompson | |
| 3,465,147 A | 9/1969 | Banville | |
| 5,151,135 A | 9/1992 | Magee et al. | |
| 5,814,156 A | 9/1998 | Elliott et al. | |
| 6,225,633 B1 | 5/2001 | Sun et al. | |
| 6,313,638 B1 | 11/2001 | Sun et al. | |
| 6,476,394 B1 * | 11/2002 | Amitani ................ G01T 1/2018 250/368 |

(Continued)

FOREIGN PATENT DOCUMENTS

| | | | |
|---|---|---|---|
| CN | 103018164 | 4/2013 | |
| CN | 107153214 | * 9/2017 | ................ C01T 1/24 |
| WO | WO 2017/154261 | 9/2017 | |

OTHER PUBLICATIONS

Machine translation of CN107153214 (Year: 2017).*

(Continued)

*Primary Examiner* — Erin F Bergner
(74) *Attorney, Agent, or Firm* — Dority & Manning, P.A.

(57) ABSTRACT

Radiation detectors and methods of using the radiation detectors that provide a route for surface decontamination during use are described. The detectors utilize light illumination of an internal surface during use. Light is in the longer UV-to-near-infrared spectra and desorbs contamination from internal surfaces of radiation detectors. The methods can be carried out while the detectors are in operation, preventing the appearance of the negative effects of radioactive and non-radioactive contamination during a detection regime and following a detection regime.

16 Claims, 5 Drawing Sheets

(56) References Cited

U.S. PATENT DOCUMENTS

| | | | |
|---|---|---|---|
| 6,734,435 | B2 | 5/2004 | Sun et al. |
| 6,811,615 | B2 | 11/2004 | Sun |
| 10,016,745 | B2 | 7/2018 | Murph et al. |
| 2005/0042385 | A1 | 2/2005 | Okabe et al. |
| 2008/0121248 | A1 | 5/2008 | Turco et al. |
| 2009/0090383 | A1 | 4/2009 | Ingleson |
| 2010/0269851 | A1 | 10/2010 | Minehara |
| 2019/0086560 | A1 | 3/2019 | Arimoto et al. |

OTHER PUBLICATIONS

Brongersma, et al. "Plasmon-induced hot carrier science and technology" *Nat. Nanotech.* 10(1) (2015) pp. 25-34.

Owega, et al. "Surface Plasmon Resonance-laser Desorption/Ionization-Time-of-Flight Moss Spectrometry" *Anal Chem.* 70(11) (1998) pp. 2360-2365. (Abstract only).

Shu, et al. "Tritium decontamination of TFTR carbon tiles employing ultra violet light" *J. Nucl. Mater.* 290-293 (2001) pp. 482-485. (Abstract only).

Shu, et al. "Tritium Decontamination of TFTR D-T Plasma Facing Components Using an Ultra Violet Laser" *Fusion Sci. Tech.* 41(3P2) (2002) pp. 690-694. (Abstract only).

Venhaus, et al. "The effect of UV light irradiation on the removal of tritium from the codeposited carbon-tritium layer in fusion reactors" *J. Nucl. Mater.* 302(2-3) (2002) pp. 224-226. (Abstract only).

Vig, J.R. "UV/ozone cleaning of surfaces" *J. Vac. Sci. Tech. A* 3(3) (1985) pp. 1021-1034.

Widdowson, et al. "Efficacy of photon cleaning of JET divertor tiles" *J. Nucl. Mater.* 363-365 (2007) pp. 341-345.

Zion, et al. "UV Photodesorption of Novel Molecular Beam Induced NO Layers on Ni0(111)/Ni(111)" *J. Phys. Chem. C* 112(15) (2008) pp. 5961-5965.

Owega, et al. "Surface Plasmon Resonance-laser Desorption/Ionization-Time-of-Flight Moss Spectrometry" *Anal. Chem.* 70(11) (1998) pp. 2360-2365.

Shu, et al. "Tritium decontamination of TFTR carbon tiles employing ultra violet light" *J. Nucl. Mater.* 290-293 (2001) pp. 482-485.

Venhaus, et al. "The effect of UV light irradiation on the removal of tritium from the codeposited carbon-tritium layer in fusion reactors" *J. Nucl. Mater.* 302(2-3) (2002) pp. 224-226.

Vig, J.R. "UV/ozone cleaning of surfaces" *J. Vac. Sci. Tech. A* 3 (1985) pp. 1021-1034.

\* cited by examiner

RADIATION DETECTORS EMPLOYING CONTEMPORANEOUS DETECTION AND DECONTAMINATION

CROSS REFERENCE TO RELATED APPLICATION

This application is a divisional application of U.S. patent application Ser. No. 16/125,954, having a filing date Sep. 10, 2018, which is incorporated herein by reference in its entirety.

FEDERAL RESEARCH STATEMENT

This invention was made with Government support under Grant No. DE-AC09-08SR22470, awarded by the U.S. Department of Energy. The Government has certain rights in the invention.

BACKGROUND

Radiation detectors such as ion chambers, proportional counters, Geiger-Müller counters, and scintillation counters are used in a wide variety of applications in the medical, personal safety, and security fields, among others. Radiation detectors can be utilized to examine gaseous, liquid, or solid samples to determine the presence, type, or level of radioactivity of any type (e.g., alpha or beta particles, gamma rays, x-rays).

Unfortunately, radiation detectors of all types may become contaminated during use, which can lead to inaccuracies in detection regimes. For instance, radiation detectors can suffer from "memory effects," in which radioactive material may interact in some way with, and be retained by, the detector. By way of example, the surface of a sample chamber can be contaminated with radioactive material during a detection protocol. Upon later use, the detector may respond to the retained radioactive material, rather than or in addition to the response due to radiation effects of the current detection regime. Thus, the detector may exhibit a response even though the current detection regime is not encountering any radioactive materials or the detector may exhibit a stronger response than accurate for the current regime. Effectively, the detector "remembers" the radiation of the previous regime. While any radiation detector may experience such a memory effect if its active surface becomes contaminated by radioactive material, gaseous ionization detectors (e.g., ion chambers, Geiger counters), scintillation detectors, and β-induced x-ray spectrometry detectors are known to exhibit such memory effects.

Surface contamination issues in radiation detectors are not limited to radioactive contamination, and sample chamber surface contamination from water and other non-radioactive absorbed species can also negatively affect radiation detectors. For example, non-radioactive moisture contamination can cause stray current to leak across the surfaces of contaminated insulators, leading to higher background signals in radiation detectors.

The performance of radiation detectors could be improved by removing both radioactive and non-radioactive contamination from sample chamber surfaces. Many approaches for cleaning sample chamber surfaces have been suggested, primary among which are ozone-based cleaning methods in which a sample chamber is filled with ozone while not in operation. The use of UV light illumination has also been shown to remove surface contamination and create atomically clean metal surfaces for devices. However, known light illumination processes combine light at the lower end of the UV spectra (generally less than 200 nm) with reactive ozone, use expensive pulsed lasers, and/or operate only in vacuum conditions. Moreover, such approaches are generally expensive and unwieldly and do not prevent the appearance of background signals due to surface contamination during the course of a detection regime, which can halt a regime mid-procedure and take the detector off-line, preventing further use of the detector until a thorough cleaning protocol (e.g., using ozone) has been carried out.

What are needed in the art are devices and methods for removal of both radioactive and non-radioactive contamination from the surfaces of radiation detectors that can function during use of the detectors so as to prevent background signals during a detection protocol and prevent down-time for detectors.

SUMMARY

According to one embodiment, disclosed is a radiation detector that includes a light source in optical communication with an internal surface of the radiation detector, the internal surface being a surface that is held in radioactive communication with a potential radiation source during a detection protocol; for instance, a wall of a gas sample chamber or the surface of a scintillator. The light source is configured to direct light in the longer ultra-violet (UV)-to-near infra-red wavelength range at the surface. The light can be e.g., from about 255 nm to about 2500 nm, and can include light of a narrow or broad spectrum. The radiation detector can optionally include additional materials that can enhance the surface decontamination effects of the light. For instance, the radiation detector can include light enhancing nanoparticles (e.g., metal nanoparticles), photocatalysts, or nano-structured electrodes at the surface that can further improve the surface decontamination effects of the light.

Also disclosed are methods for decontamination of a radiation detector during use. For instance, a method can include locating a radiation detector in radioactive communication with a potential radiation source. The method can also include establishing detection conditions for the detector (e.g., establishment of an electric field in a gas sample chamber, bringing a component of the detector, e.g., a scintillator or a gas sample, into radioactive communication with a potential radiation source, etc.) such that the radiation detector registers the presence, type, or quantity of radioactivity in the potential radiation source following the establishment of the detection conditions. In addition, the method can include impinging an internal surface of the detector with light in the longer UV-to-near-IR spectra (e.g., from about 255 nm to about 2500 nm). This step can be simultaneous with the establishment of the detection conditions and the registration of the presence, type, or quantity of radioactivity in the source. By use of the method, the internal surface of the detector can be decontaminated simultaneously with the detection regime, preventing background signal during the regime as well as memory effects in later detection regimes.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1A:
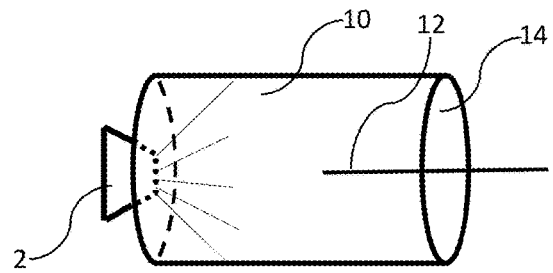
FIG. 1A, FIG. 1B, FIG. 1C, and FIG. 1D schematically illustrate several examples of ionization chambers described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed herein are radiation detectors and methods of using the radiation detectors that provide a route for surface decontamination during use. More specifically, disclosed detectors utilize light illumination in the longer UV-to-near-infrared spectra to desorb contamination from internal surfaces of radiation detectors. Beneficially, the methods can be carried out while the detectors are in operation, preventing the appearance of the negative effects of radioactive and non-radioactive contamination (e.g., memory effects, increased background signal, etc.) both during a detection regime and following a detection regime (during later regimes).

UV light is generally understood to span the electromagnetic spectrum from about 10 nm to about 400 nm, and IR light is generally understood to span the electromagnetic spectrum from about 700 nm to about 1 mm, with visible light falling between the two. The presently disclosed devices and methods can utilize any light from the upper end of the UV spectrum (e.g., about 255 nm or greater) to the lower end of the IR spectrum (e.g., about 2500 nm or less, generally referred to as near IR) to decontaminate a surface of a radiation detector.

Beneficially, the light source can deliver any light, either narrow or broad spectrum, to the surface to be treated. As such, the devices do not require coherent light sources (lasers), though lasers can be utilized if desired. In addition, the decontamination methodology does not require the use of ozone in conjunction with the light treatment and can carried out with the surface held in conjunction with material (e.g., a gas sample) at any pressure. Moreover, while the methods can beneficially be utilized during a radiation detection regime, the use of the devices is not limited to such, and the methods can be effective for cleaning internal surfaces of a radiation detector either or both of during use and while the detector is off-line.

Any light source configured to direct light within the desired spectra at an internal surface of a radiation detector is encompassed herein. For instance, light emitting diodes (LEDs) of a narrow (e.g., single) wavelength or lasers providing a single wavelength coherent light can be used. However, a broad spectrum light source may optionally be used, and may be preferred in some embodiments. A broad spectrum light source can deliver light including any wavelength range spanning all or any portion of the spectra from the upper end of the UV spectrum to the near IR spectrum. Moreover, a broad spectrum light source can include light outside of this range, provided it also includes light within this range.

A light source can be located in/on a device so as to expose a large surface area of a radiation detector in the light or alternatively, can be directed at a relatively small surface area. Light sources can optionally be adjustable, so as to modify the light impinging surface. For example, a raster methodology or a pulsed light source can be utilized, in which a light is systematically directed to one or more surfaces of a radiation detector; for instance, over the course of a detection regime. A systematic, raster-type impingement approach can be carried out a single time over the course of a single detection regime or can be repeated, such that the different surface areas of the radiation detector are impinged with the light multiple times over the course of a single detection regime. Of course, a constant, steady light impingement of a surface over an entire detection regime is also encompassed herein.

Radiation detectors that can beneficially incorporate a decontamination light source are not particularly limited, and the disclosed methods can be beneficial for any detector that includes an internal surface that may potentially be contaminated with radioactive or non-radioactive materials during use. By way of example, and without limitation, radiation detectors encompassed herein can include gaseous ionization detectors (ion chambers, proportional counters, Geiger counters), scintillation detectors incorporating organic scintillators, inorganic scintillators, or combinations thereof, and BIXS systems.

FIGS. 1A-1D illustrate several examples of ion chambers incorporating a decontamination light source. As shown at FIG. 1A, an ionization chamber can include a sample chamber 10, a first collecting electrode 12, and a second collecting electrode 14. During use, one of the collecting electrodes, e.g., 12, can function as an anode and can be positively charged with respect to the other collecting electrode, e.g., 14 (functioning as a cathode). In this embodiment, the chamber wall serves as the second collecting electrode 14.

The shape of the collecting electrodes in an ionization chamber can vary. For instance, in the embodiment of FIG. 1B, the first collecting electrode 12 is in the shape of a cone, and the second collecting electrode 14 can be at the wall of the sample chamber 20, as in the embodiment of FIG. 1A. In the embodiment of FIG. 1D, the two collecting electrodes 12, 14 are in the form of flat parallel plates held within a sample chamber 30.

Figure 1C:
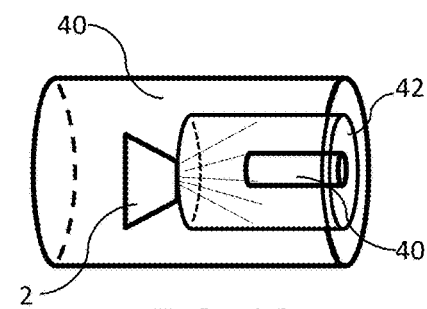
Figure 1B:
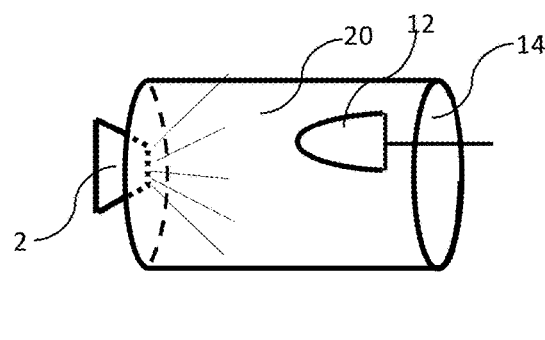
Figure 1D:
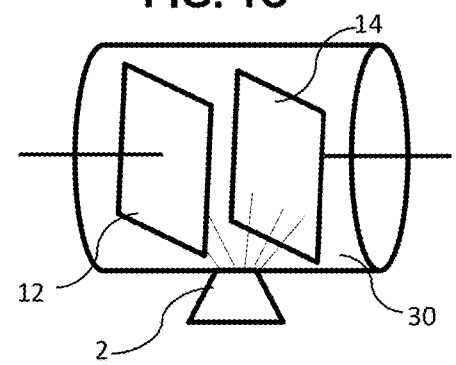

Another type of ionization chamber encompassed herein is a well detector type detector as illustrated in FIG. 1C. In this embodiment, the outer wall of the sample chamber 40 functions as a first collecting electrode and a portion of this collecting electrode 40 extends down inside a hollow tube, which forms a second collecting electrode 42.

No matter what the configuration of the ionization chamber, the radiation detector can include a light source 2 that is located with respect to the sample chamber 10, 20, 30, 40, so as to direct light on a wall of the sample chamber and/or any other internal surface of the detector (e.g., insulators, electrodes, etc.) that may be contaminated with radioactive or nonradioactive contaminants during use. As stated, the light source 2 can deliver light in a broad or narrow spectrum within the long UV-to-near-IR spectra and can deliver light to all or a portion of the sample chamber wall either continuously during a detection regime or periodically during a detection regime, as well as between regimes, when the detector is not in use.

During use, a gaseous sample that is held in the sample chamber 10, 20, 30, 40 is placed under a potential difference that is established between the first and second collecting electrodes 12, 14. For instance, a potential difference of from about 100 volts (V) to 500 V at atmospheric pressure can be established in a typical ionization chamber. Of course, the most appropriate voltage for any particular system can depend on a number of characteristics such as the chamber size, the type of radiation to be detected, etc.

Upon radioactive communication with a radiation source, components of the gaseous sample can be ionized, creating ion pairs including the resultant positive ions and dissociated electrons. For instance, a radiation source in the area of the sample chamber can emit ionizing particles (alpha particles or beta particles) that can pass into the sample chamber and ionize the gaseous sample. Of course, detection of low energy radiation requires that the radioactive particles can penetrate and access the gas sample held in the sample chamber, i.e., that the radiation source is in radioactive communication with the gas held in the sample chamber; for instance, through a suitable window. Higher energy radiation sources (gamma or x-rays) can also directly ionize the gaseous sample and create the ion pairs, as well indirectly ionize the gaseous sample via electrons, to which gamma rays or x-rays have transferred energy according to the photoelectric effect, Compton scattering, or pair production.

The ion pairs created upon interaction of the gas with the ionizing radiation can move to the respective electrodes of the opposite polarity under the influence of the electric field. The ionization current thus generated can then be measured by a suitable electrometer circuit (often in the region of femtoamperes to picoamperes, depending on the chamber design, radiation dose, and applied voltage). In general, ionization chambers operate at relatively low voltages and, as such, do not discriminate between radiation types and do not produce an energy spectrum of radiation.

Gaseous radiation detectors that operate at higher electric field strengths as compared to an ionization chamber are also encompassed herein. For instance, a radiation detector that includes a decontamination light as described can be a gaseous detector that exhibits a multiplication effect such as a Geiger-Müller tube or a proportional counter in which secondary electrons, and ultimately, Townsend avalanches, can greatly amplify the ion-current charge.

Figure 2:
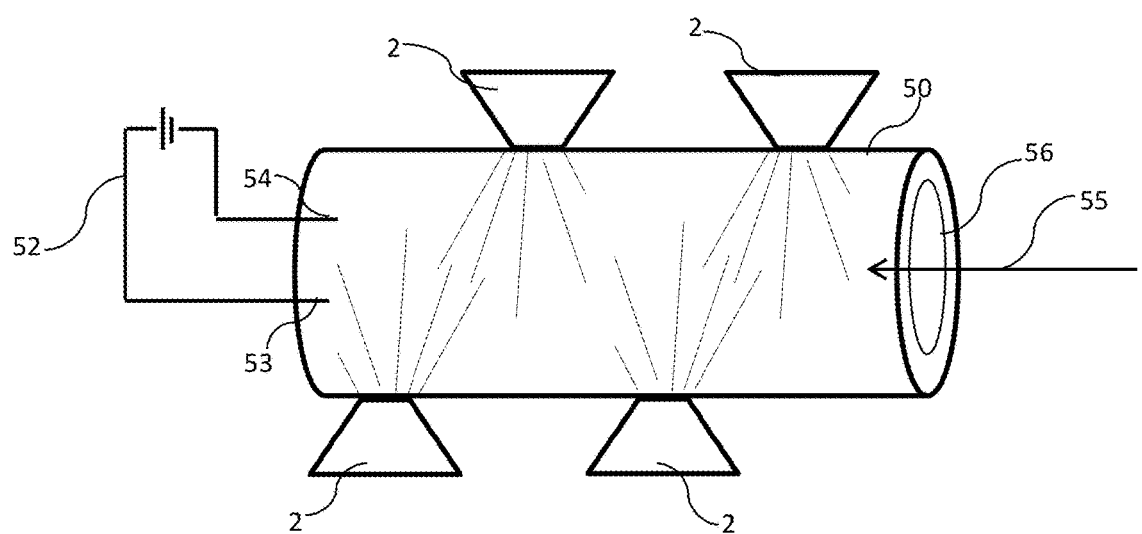
FIG. 2 schematically illustrates an embodiment of another gaseous radiation detector as described herein.

By way of example, FIG. 2 schematically illustrates a gaseous radiation detector such as a Geiger counter or a proportional counter that includes an electric circuit 52 connected to electrodes 53, 54 configured to establish a relatively high voltage potential across a gas held in a sample chamber 50. In order to detect alpha and low energy beta particles, a gaseous detector can optionally include a window 56 that is thin enough to allow penetration of such particles, e.g., mica with a density of about 1.5 to about 2.0 mg/cm$^2$ and thus provide low energy radioactive communication between a radiation source and the gas held in the sample chamber.

A proportional counter can include as a fill gas of the sample chamber 50 an inert gas (e.g., argon) that is ionized by incident radiation 55, and a quench gas, such as methane, that ensures that each pulse discharge terminates. As the ionizing radiation travels through the sample chamber 50, it forms ion pairs along its trajectory, as with the ionization chamber. In contrast to the ionization chamber, however, the electric field strength is greater, for instance, about 500 V or greater at atmospheric pressure, which can prevent recombination of the ion pairs and in the vicinity of the anode, the field strength can become large enough to produce Townsend avalanches. This provides for the multiplication effect of the avalanche produced by each ion pair and a detector output pulse that is proportional to the radiation energy absorbed. Proportional counters can be desired in certain embodiments; for instance, to discriminate between alpha and beta particles, or to provide a more accurate measurement of X-ray radiation dose.

The Geiger-Müller tube of a typical Geiger counter is a gaseous radiation detector that operates at the highest electric field of the three types of gaseous detectors. The sample chamber is filled with an inert gas such as helium, neon, or argon at low pressure and a quench gas (e.g., halogen or alcohol) to stop the ionization discharge, to which a high voltage is applied (e.g., about 450 V to about 600 V at low pressure). The tube briefly conducts electrical charge when incident radiation makes the gas conductive by ionization. The ionization is considerably amplified within the tube by the Townsend discharge effect to produce an easily measured detection pulse, which is fed to processing, and to display electronics (not illustrated in the figures).

As shown, a gaseous radiation detector as illustrated in FIG. 2 can include one or more decontamination lights 2 as described above that can be located on or in the sample chamber 50 so as to direct light at a wall of the sample chamber or any other internal surface of the detector during use.

Figure 3:
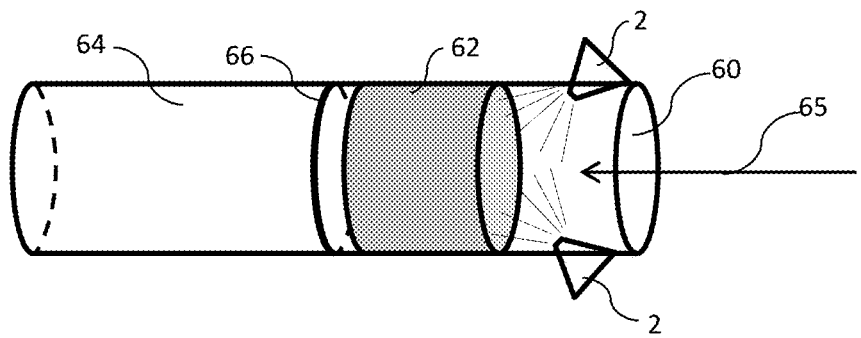
FIG. 3 schematically illustrates one embodiment of a scintillation counter as described herein.

FIG. 3 schematically illustrates a scintillator counter as another type of radiation detector as may incorporate a decontamination light 2 (or a plurality thereof). A scintillation counter can include one or more decontamination lights 2 located so as to impinge all or a portion of a sample chamber 60 and/or a scintillator 62 with decontamination light, as described. As shown, a scintillation counter can include a scintillator 62 in combination with a photodetector 64 which generally incorporates a photomultiplier tube. Depending upon the nature of the scintillator 62, the scintillator 62 and the photodetector 64 can be separated by an optically transparent window 66.

A scintillator counter can incorporate any suitable scintillator including, without limitation, organic or inorganic scintillators, as well as solid or liquid phase scintillators. For instance, in one embodiment, a sample to be analyzed can be dissolved/dispersed in a liquid scintillator such that radioactive isotopes of the sample can contact molecules of the liquid scintillator, with interaction between the two, transforming radioactive energy of the sample into photons detectable by the photodetector 64. Typically, liquid scintillators can include an aromatic solvent into which a small amount of fluorescing compounds (e.g., naphthalene or anthracene) are dissolved. The radioactive particle (e.g., alpha or beta particle) excites solvent molecules and the excited states migrate to the fluors. Their subsequent de-excitation produces the detectable photons.

Of course, disclosed scintillation counter radiation detectors are not limited to liquid scintillators or photomultipliers as the photodetector, and other materials as are known in the art can be incorporated. For instance, any single-crystal or poly-crystalline scintillating materials that responds to incident radiation by emitting photons can be optically coupled to a photo detector such as, for example, a photo-diode, PIN diode, or photoresistor.

Exemplary inorganic scintillator crystals can include, without limitation, thallium-doped sodium iodide (Tl:NaI) crystals, crystals based on cesium iodide (CsI) that may be used pure or doped (e.g., with thallium or sodium) bismuth germanate (BGO) based crystals, or cerium-activated lutetium oxyorthosilicate Ce:LSO crystals.

Examples of organic scintillators can include, without limitation, crystals having a plurality of aromatic rings such as, without limitation, polynuclear aromatic compounds or hydrocarbons including a series of interconnected rings including at least two aromatic rings such as anthracene, naphthacene, pentacene, hexacene, phenanthrene, chrysene, picene, 1,2,5,6-dibenzanthracene, 2,3,6,7-dibenzphenanthrene, pyrene, fluoranthene, fluorene, dibenzo-fluorene, dinaphtho-fluorene, carbazole, naphthophenocarbazole, diphenylene oxide, and the like or mixtures of such compounds. Hybrid organic/inorganic scintillator crystals as are known in the art may likewise be incorporated in a radiation detector.

As indicated in FIG. 3, among the internal surfaces of the detector that can be contacted with the decontamination light can be included any surface of a solid scintillator that is in radioactive communication with a sample or radiation from a radiation source including, without limitation, sample walls, scintillators, internal windows, and components of a photodetector (e.g., surfaces of a photomultiplier tube, including wall surfaces and the electrodes of the detector).

Figure 4:
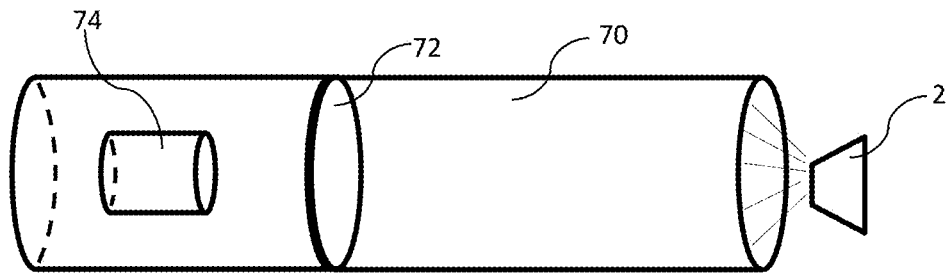
FIG. 4 schematically illustrates one embodiment of a β-induced x-ray spectrometry (BIXS) detector as described herein.

Yet another exemplary radiation detector type as may incorporate a decontamination light is a BIXS type detector, an example of which is illustrated in FIG. 4. BIXS detectors can be particularly useful in tritium detection, though they are by no means limited to such applications. As indicated, a BIXS detector can include a sample chamber 70, one or more decontamination lights 2, an x-ray generating window 72 such as a gold-coated beryllium window, and an x-ray detector 74, e.g., a silicon drift detector.

During use, a radiation source, e.g., a gaseous, solid, or liquid suspected of containing tritium, can be located in radioactive communication with the x-ray generating window 72. By way of example, a sample chamber 70 can be filled with a tritium-containing liquid or gas. Tritium contained in the sample will emit beta particles that, upon striking the x-ray producing window 74, will emit x-rays. At least a portion of the x-rays produced at the window can penetrate to be detected at the x-ray detector, and the x-ray intensity detected can be proportional to the tritium concentration (e.g., the tritium partial pressure) of the sample.

In one embodiment, a radiation detector can include decontamination enhancing material that can be utilized in conjunction with a decontamination light as described. For instance, an internal surface to be decontaminated by the light can be coated with a material that can enhance the decontamination process; for instance, through improved light interaction with the surface.

A decontamination enhancement material can, in one embodiment, include nanoparticles that include or are formed of a material that favorably interacts with light in the desired spectra, e.g., metals, which can enhance the decontamination process through plasmonic interactions. Plasmonic nanoparticles can exhibit a resonant interaction with the decontamination light that matches the plasmon frequency of the particle. At this frequency, the particle can act as a nano-antenna, gathering light from an area much larger than the particle itself, generating high intensities by concentrating the electromagnetic energy in the near-field and redirecting optical energy in new directions through scattering. The plasmon frequency can vary and can be controlled via control of the size, shape, material, and surrounding environment of the particle. Beneficially, such parameters can be used to tune the way that the particle interacts with the decontamination light; for instance, through control of the angular distribution of scattered light to better direct the light at the desired surfaces of the detector.

Metals as may be included in a decontamination enhancing nanoparticle can include, without limitation, aluminum, copper, gold, iron, silver, titanium, nickel, zinc, rhodium or combinations thereof. Metal oxide photocatalysts are also encompassed herein including, without limitation, titanium oxides, zinc oxides, tin oxides, strontium titanates, tungsten oxides, bismuth oxides, iron oxides, vanadium oxides, or combinations thereof.

In general, nanostructures at a surface of a detector can have a characteristic size dimension (e.g., an average cross-sectional dimension) of about 500 nm or less; for instance, from about 1 to about 400 nm, or from about 10 to about 200 nm, in some embodiments. Metal nanoparticles can be formed according to standard methodologies, such as colloidal synthesis processes, which can provide a large degree of control over the size and shape of the particles. In addition, the particles can be embedded, chemically attached (bonded), or adhered to an internal surface of a detector according to any suitable process, e.g., spray techniques, drop-casting, self-assembly, or lithographic approaches.

Figure 5:
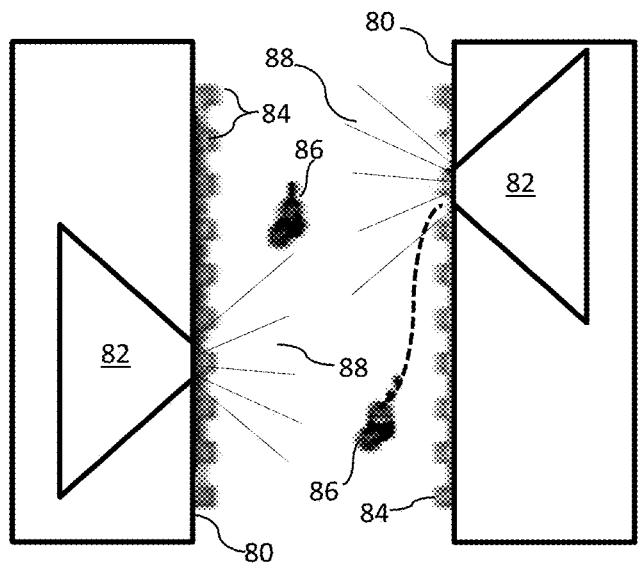
FIG. 5 schematically illustrates a portion of an internal surface of a radiation detector including decontamination enhancement materials as described herein.

FIG. 5 schematically illustrates one example of internal surfaces 80 of a detector including a plurality of nanostructures 84 at the surfaces 80. During use, contamination particles, e.g., tritiated gas molecules 86 can adhere to the surface 80. Under the influence of the signal 88 produced from the interaction of light from light source 82 with the nanostructures 84, adhered contamination particles 86 can separate from the surface 80, as indicated.

Additional examples of decontamination enhancement materials can include silver salts of an organic acid, such as carboxylic acids, sulfonic acids, sulfinic acids, phenols, enols, thiophenols, imides, oximes, primary or secondary nitro compounds, or clathrate compounds. In one embodiment, a silver salt of an inorganic acid, such as a chloric acid, a perchloric acid or a fluorine, can be used as an inorganic enhancement material.

Radiation detectors and methods as described herein can beneficially be utilized in facilities and application that include monitoring or handling of radioactive agents for improved safety and control. For instance, and without limitation, disclosed devices could be beneficially employed in medical isotope production and use, nuclear fusion and fission reactors, as well as in non-proliferation monitoring. Disclosed devices can provide for more efficient use of detectors, as they can eliminate down time for cleaning operations and can increase worker safety through improved monitoring, as well as decreased exposure, during cleaning processes.

The present disclosure may be better understood with reference to the Examples set forth below.

Example 1

Figure 6:
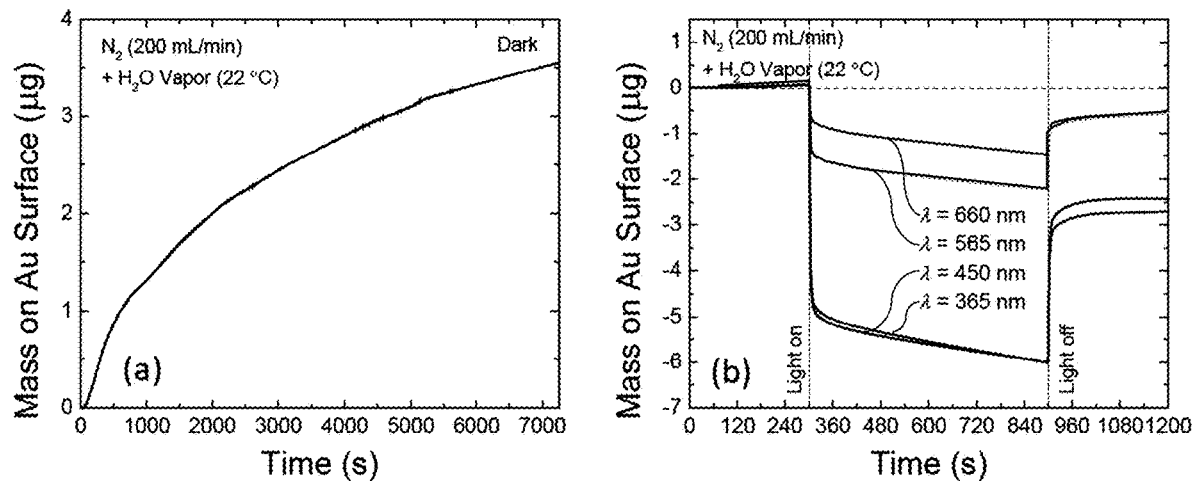
FIG. 6 presents at (a) a quartz crystal microbalance (QCM) trace versus time showing increase in mass on a gold surface after water vapor was introduced to a system and at (b) QCM traces versus time showing decrease in mass on a water saturated gold surface after light emitting diodes (LEDs) with different wavelengths were turned on/off.

A quartz crystal microbalance (QCM) system was employed to measure trace amounts of surface adsorbed species on gold surfaces. QCMs are often used to measure materials at angstrom level ($10^{-10}$ m) thicknesses. A gold-coated QCM crystal was placed in a vessel and exposed to water vapor-saturated (22° C.) flowing $N_2$ gas (200 mL/min), and the QCM signal indicated that water was being deposited on the surface of the gold (FIG. 6(a)). Next, the gold surface was exposed to LED light illumination while in the flowing $N_2$ gas and water vapor. Upon LED light illumination for all wavelengths tested, the mass on the gold surface decreased dramatically (FIG. 6(b)), indicating that the light was removing the trace amounts of water that had been adsorbed and absorbed by the gold-coated QCM crystal. Surface water is an important contamination source for radiation detectors, as described above. Additionally, water contamination is especially problematic for tritium (radioactive hydrogen) detection, as isotopic exchange will result in non-radioactive surface water becoming radioactive and producing a background signal (memory effect).

Example 2

Figure 7:
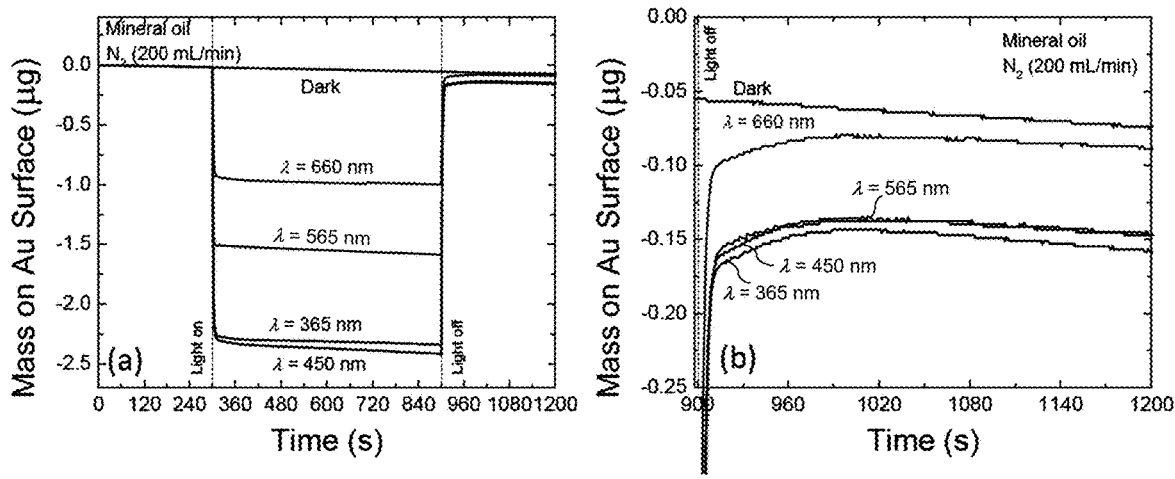
FIG. 7 presents at (a) QCM traces versus time showing decrease in mass on a hydrocarbon (mineral oil)-contaminated gold surface after LEDs with different wavelengths were turned on/off and at (b) a portion of the trace of the mass on the gold surface after the LEDs were turned off at 900 s.

Carbon-based contamination removal by use of disclosed methods was examined. Mineral oil (a representative, non-volatile hydrocarbon) was pipetted onto the gold-coated QCM crystal, and then placed in a measurement chamber under flowing $N_2$ gas (200 mL/min). The contaminated gold surface was exposed to LED light illumination while in the flowing $N_2$ gas. For all wavelengths of LED light illumination, the mass on the gold surface decreased (FIG. 7), indicating that the light was removing the hydrocarbon contamination that was deposited onto the gold-coated QCM crystal. Carbon contamination is ubiquitous and can lead to leakage currents and background signals from isotopic exchange.

Example 3

Figure 8:
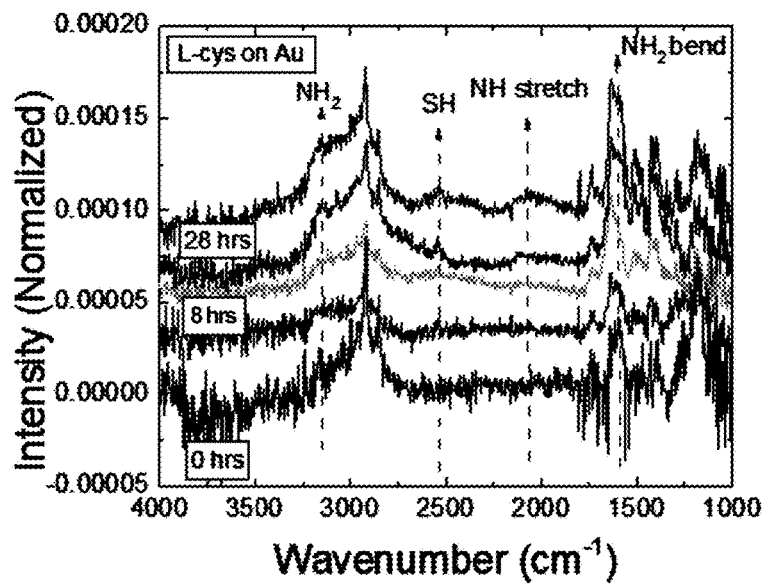
FIG. 8 presents Fourier-transform infrared spectroscopy (FTIR) of L-cysteine on gold after different UV LED ($\lambda=365$ nm) irradiation times. Increasing peaks are shown. The spectra are offset to improve clarity.

Fourier-transform infrared (FTIR) spectroscopy can provide insight into the chemical changes occurring in the surface contamination under LED illumination. FIG. 8 shows the changes in L-cysteine following adsorption onto a gold surface and exposure to an UV LED light source. L-cysteine served as a representative chemically absorbed carbonaceous contamination source. It chemically adsorbs to gold surfaces through thiol (gold-sulfur) and/or amine (gold-nitrogen) bonds. Therefore, SH, NH, and $NH_2$ vibrational modes were not seen in the FTIR spectra when L-cysteine was chemically bonded to the gold surface. As seen in FIG. 8, initially these vibrational modes were not seen, indicating that the L-cysteine was chemically adsorbed on the gold surface. As the illumination time increased, these modes reappeared, revealing that the UV light was breaking the surface chemical bonds of L-cysteine.

Figure 9:
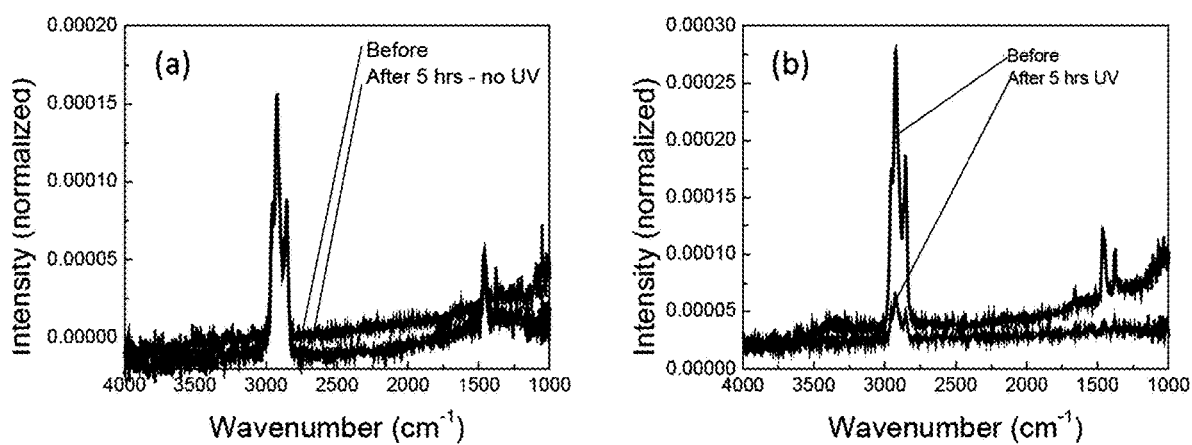
FIG. 9 presents at (a) FTIR spectra from a dark experiment, showing that after 5 hours with no light exposure, the hydrocarbon peaks from mineral oil remain strong and at (b) FTIR from an LED experiment, showing that after 5 hours of UV LED ($\lambda=365$ nm) exposure the hydrocarbon peaks decreased and disappeared.
Figure 10:
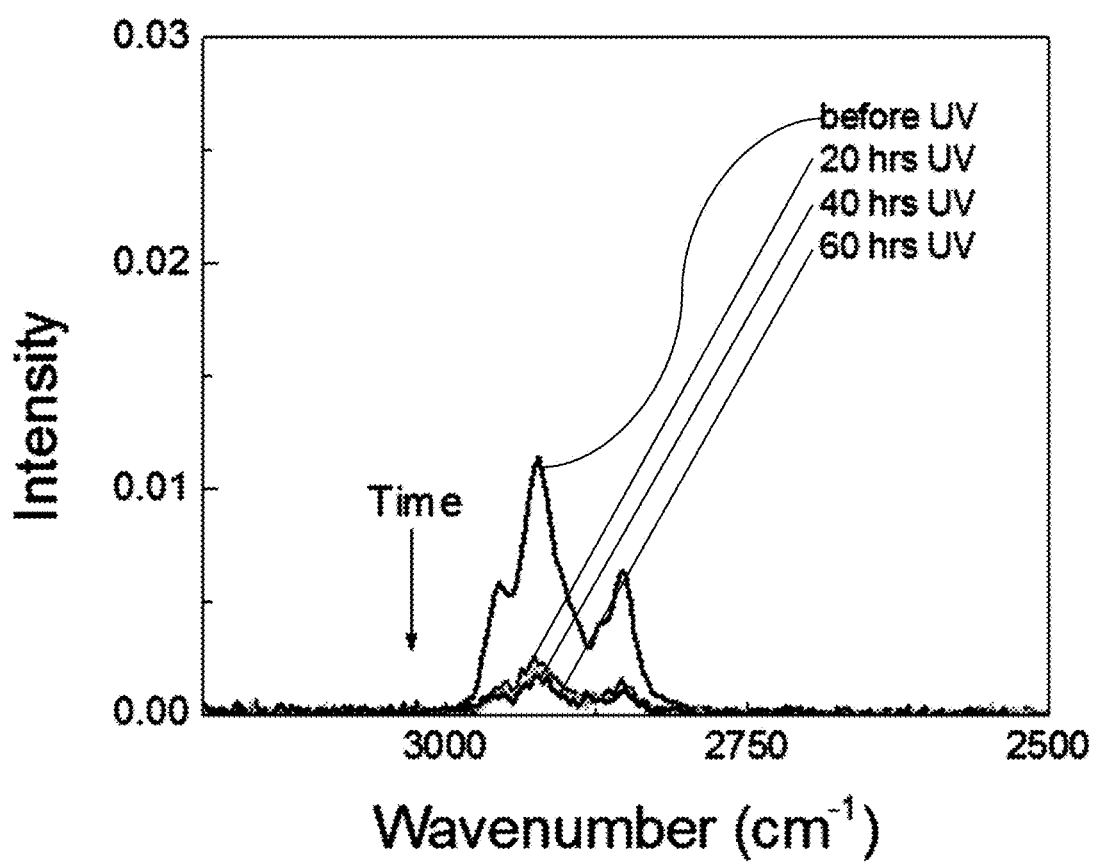
FIG. 10 illustrates "native" carbon contamination of stainless steel coupons from processing, as indicated by $CH_3$ peaks observed in an FTIR spectra. Upon illumination with UV LED ($\lambda=365$ nm), the peaks decreased, indicating removal of the contamination.

FIG. 9 and FIG. 10 show the changes in the FTIR spectra in carbon contamination on gold (mineral oil) and stainless steel (native) surfaces under illumination, respectively. These data confirm the QCM data in showing that the LED light illumination removed hydrocarbon contamination from different surfaces.

While certain embodiments of the disclosed subject matter have been described using specific terms, such description is for illustrative purposes only, and it is to be understood that changes and variations may be made without departing from the spirit or scope of the subject matter.

What is claimed is:

1. A radiation detector comprising a light source in optical communication with an internal surface of the radiation detector, the light source being configured to decontaminate the internal surface by directing light having a wavelength from about 255 nanometers to about 2500 nm at the internal surface of the radiation detector contemporaneous with operation of the radiation detector to establish radiation detection conditions of the radiation detector.

2. The radiation detector of claim 1, wherein the radiation detector comprises a gas sample chamber, the gas sample chamber comprising at least a portion of the internal surface.

3. The radiation detector of claim 2, wherein the radiation detector comprises first and second electrodes configured to establish a potential difference across the gas sample chamber.

4. The radiation detector of claim 1, wherein the radiation detector comprises a scintillator, the scintillator comprising at least a portion of the internal surface.

5. The radiation detector of claim 1, wherein the radiation detector is a β-induced x-ray spectrometry detector.

6. The radiation detector of claim 1, wherein the light source comprises a broad-spectrum light source.

7. The radiation detector of claim 1, wherein the light source comprises a single wavelength light source.

8. The radiation detector of claim 1, wherein the light source comprises a light emitting diode.

9. The radiation detector of claim 1, wherein the light source is configured to periodically communicate with the internal surface contemporaneous with operation of the radiation detector to establish radiation detection conditions.

10. The radiation detector of claim 1, further comprising a decontamination enhancing material at the internal surface.

11. The radiation detector of claim 10, wherein the decontamination enhancing material comprises plasmonic nanoparticles.

12. The radiation detector of claim 11, the plasmonic nanoparticles comprising a metal.

13. The radiation detector of claim 12, the metal comprising aluminum, copper, gold, iron, silver, titanium, nickel, zinc, rhodium, or a combination thereof.

14. The radiation detector of claim 10, wherein the decontamination enhancing material comprises a metal oxide photocatalyst.

15. The radiation detector of claim 10, wherein the decontamination enhancing material comprises a silver salt of an organic acid.

16. The radiation detector of claim 1, wherein the radiation detector comprises a tritium detector.

* * * * *